United States Patent
Pinski et al.

(10) Patent No.: US 10,355,934 B2
(45) Date of Patent: Jul. 16, 2019

(54) VERTICAL SCALING OF COMPUTING INSTANCES

(71) Applicant: Amazon Technologies, Inc., Seattle, WA (US)

(72) Inventors: Nikita Pinski, Vancouver (CA); Derek Solomon Pai, Seattle, WA (US); Ahmed Usman Khalid, Port Coquitlam (CA); Eric Samuel Stone, Seattle, WA (US); Mai-Lan Tomsen Bukovec, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 701 days.

(21) Appl. No.: 14/559,823

(22) Filed: Dec. 3, 2014

(65) Prior Publication Data
US 2016/0164738 A1    Jun. 9, 2016

(51) Int. Cl.
*H04L 12/24*    (2006.01)
*H04L 12/26*    (2006.01)
*G06F 9/50*    (2006.01)

(52) U.S. Cl.
CPC ........ *H04L 41/0896* (2013.01); *G06F 9/5061* (2013.01); *H04L 43/0888* (2013.01)

(58) Field of Classification Search
CPC . H04L 41/08–41/0896; H04L 43/08–43/0888; G06F 9/50–9/5088
See application file for complete search history.

(56) References Cited

U.S. PATENT DOCUMENTS

| | | | | |
|---|---|---|---|---|
| 9,026,765 | B1* | 5/2015 | Marshak | G06F 3/061 711/114 |
| 2004/0111509 | A1* | 6/2004 | Eilam | H04L 67/1008 709/224 |
| 2006/0031242 | A1* | 2/2006 | Hall, Jr. | G06F 9/505 |
| 2008/0320003 | A1* | 12/2008 | Heinson | H04L 29/12066 |
| 2011/0029970 | A1* | 2/2011 | Arasaratnam | G06F 9/45558 718/1 |
| 2013/0086273 | A1* | 4/2013 | Wray | G06F 9/5072 709/226 |
| 2013/0174149 | A1* | 7/2013 | Dasgupta | G06F 9/5077 718/1 |
| 2013/0185729 | A1 | 7/2013 | Vasic et al. | |
| 2014/0058871 | A1 | 2/2014 | Marr et al. | |
| 2014/0082612 | A1 | 3/2014 | Breitgand et al. | |

OTHER PUBLICATIONS

Beaumont, How to explain vertical and horizontal scaling in the cloud, Apr. 9, 2014, p. 2.*

(Continued)

*Primary Examiner* — Clayton R Williams
(74) *Attorney, Agent, or Firm* — Thorpe North & Western, LLP

(57) ABSTRACT

Technology for scaling computing instances is provided. In one example, a method may include identifying vertical scaling rules defining a criterion for vertically scaling a computing instance from a first instance type to a second instance type. The method may further include monitoring usage of the computing instance and vertically scaling the computing instance from the first instance type to the second instance type based on the usage as compared to the vertical scaling rules.

21 Claims, 7 Drawing Sheets

(56) References Cited

OTHER PUBLICATIONS

Lorido-Botran Tania et al, "A Review of Auto-scaling Techniques for Elastic Applications in Cloud Environments", Journal of Grid Computing, Oct. 11, 2014, pp. 559-592, vol. 12, No. 4, Springer, Dordrecht, Netherlands.

Sourav Dutta et al, "SmartScale: Automatic Application Scaling in Enterprise Clouds", Cloud Computing (Cloud), 2012 IEEE 5th International Conference On, Jun. 24, 2012, pp. 221-228, IEEE, Honolulu, HI.

Wenting Wang et al, "An Availability-Aware Virtual Machine Placement Approach for Dynamic Scaling of Cloud Applications", Ubiquitous Intelligence & Computing and 9th International Conference on Autonomic & Trusted Computing (UIC/ATC), 2012 9th International Conference on, Sep. 4, 2012 (Sep. 4, 2012), pp. 509-516, IEEE, Fukuoka, Japan.

\* cited by examiner

VERTICAL SCALING OF COMPUTING INSTANCES

BACKGROUND

Implementing computing systems that manage large quantities of data and/or service large numbers of users often presents problems of scale. For example, as demand for various types of computing services grow, servicing that demand may become difficult without increasing the available computing resources accordingly. To facilitate scaling of computing resources in order to meet demand, a particular computing service may be implemented as a distributed application that executes on a number of computing hardware devices (e.g., server systems) or virtualized computing instances (e.g., virtual server systems). For example, a number of different software processes executing on different computing systems may operate cooperatively to implement the computing service. When more service capacity is needed, additional hardware and/or software resources may be deployed.

Managing the provisioning of computing instances or computing hardware in computing service environments can be highly complex, due to the ever changing dynamics of application behavior in computing service environments. In particular, and by way of example, manually starting and stopping computing instances and any related virtual machines may be time consuming, inefficient and may be inadequate in responding to network conditions.

Computing resource scaling technologies are sometimes inefficient and insufficient because of the nature of changing demands. Consequently, traditional scaling technologies may improperly provision computing resources to accommodate perceived demand, and may negatively impact the quality of service or even interrupt the computing service. Service providers may end up choosing between expensive over-provisioning of computing resources or less-expensive but insufficient or inefficient computing resources for a particular demand.

DETAILED DESCRIPTION

Figure 1:
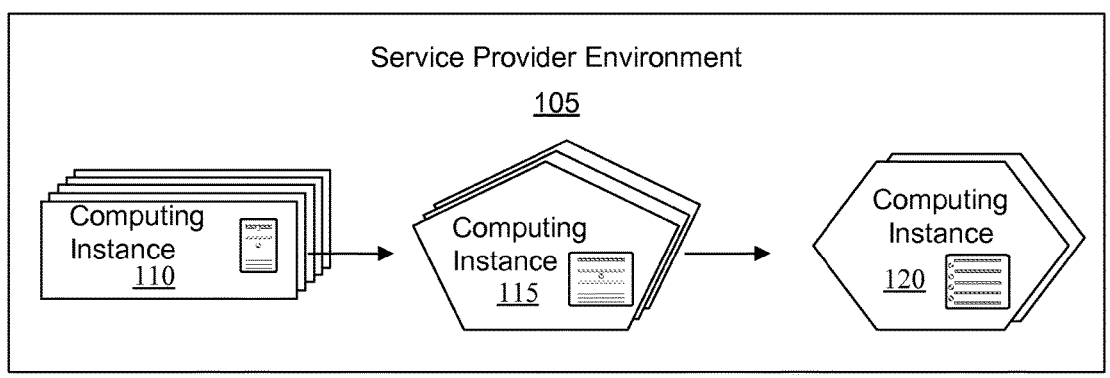
FIG. 1 is a schematic overview of vertical computing instance scaling by changing a type of computing instance provisioned as demand changes in accordance with an example of the present technology.

Technology for scaling computing instances is provided. In one example, a method may include identifying vertical scaling rules defining a criterion for vertically scaling one or more computing instances from a first instance type to a second instance type. The method may further include monitoring usage of the computing instances and vertically scaling the computing instances from the first instance type to the second instance type based on the usage as compared to vertical scaling rules.

In another example, a method for scaling computing instances may include identifying vertical scaling rules or policies defining one or more criteria for circumstances in which to vertically scale one or more computing instances (e.g., a group of computing instances). Vertical scaling may refer to the replacement of a first computing instance type with a second computing instance type different from the first computing instance type. Specifically, vertical scaling may be used to scale one or more computing instances in a group of computing instances to a more capable or less capable (e.g., more powerful or less powerful) computing instance type. The computing instance type to scale to may be selected as defined by the vertical scaling rules. For example, scaling to a more powerful computing instance type may be more capable in terms of computing processor power, memory, network bandwidth, cost, energy, etc. than simply increasing a number of computing instances of the current type. In contrast, increasing a number of the computing instances used may be a type of horizontal scaling. The method may further include monitoring a load on the computing instances and vertically scaling the computing instances from the first computing instance type to the second computing instance type when the load on the computing instances reaches a threshold defined by the vertical scaling rules.

An example horizontal scaling system may be configured to scale to meet demand on a computing instance. The computing instance may represent a group or cluster of computing instances. At a time T1, a computing instance may be configured to provide a service over a network to a client. The computing instance may be operating and providing the service within the currently available resources for the computing instance. In other words, resource demands such as storage, memory, processor, etc. are met with the configuration. However, increased demand may be placed upon the computing instance. The increased demand may optionally be predicted or scheduled in advance of an actual increase in demand. An increase in demand may relate to: planned events or activities for a service executing on the group of computing instances (e.g., a promotion or sale), general activity on the Internet (e.g., the service is promoted or featured on a popular website), or any of a wide variety of other types of demand. A scaling policy may be horizontal in that a customer may define a template for launching computing instances based on actual, predicted or scheduled demand or resource usage. A service provider may then manage the computing instances based on alarms, rules, etc. defined by the customer in order to increase or decrease the number of computing instances or servers deployed at a given time.

While optimizing computing instance deployment by increasing or decreasing a number of the computing instances is useful, load, cost or other concerns may be addressed by optimizing for different instance types rather than just the number of computing instances. Service providers often currently offer a wide variety of computing instance types to satisfy customers and accommodate any type of workload.

The present technology, as illustrated in FIG. 1, enables customers to define a policy or rules that describe changing computing instance types based on alarms, triggers, schedules and the like. The computing instances may be maintained in a service provider environment 105. Customers may be presented with options to upgrade or downgrade the computing instance type as needed. As load increases, the computing instance type may be replaced with a more powerful computing instance type. As load decreases, the computing instance type may be replaced with a less powerful computing instance type. For example, in FIG. 1, the computing instance 110 at time T1 is a different type than the computing instance 115 at time T2 which is different than the computing instance 120 at time T3.

Figure 2:
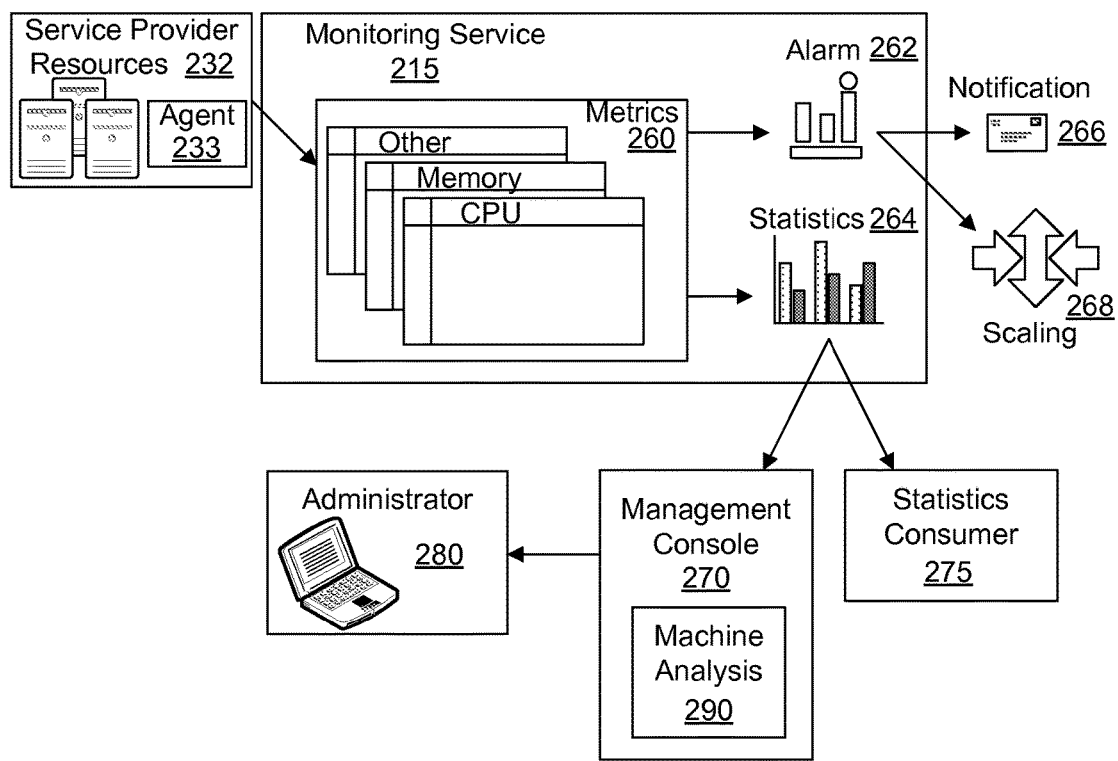
FIG. 2 illustrates an example monitoring service for monitoring demand to provide vertical scaling in accordance with an example of the present technology.

The service provider may offer a management console 270, as shown in FIG. 2, through which an administrator 280 may specify the type of instance that a launch configuration contains and to further specify how the instance type is to change under defined conditions. In one example, the administrator 280 may define simple rules (e.g., based on total load) to move to a specific instance type that is more powerful or less powerful instance type than a current instance type based on an increased or decreased demand. However, in another example, the administrator 280 may implement scaling policies that make changes to instance types and which may balance a variety of considerations, such as cost, demand, latency and so forth. Each of these considerations may be weighted and compared to identify an useful upgrade or downgrade to a computing instance type which best matches an intent of the administrator 280 as defined by the vertical scaling rules.

Generally, when a computing instance type is upgraded to a more capable or more powerful computing instance type, assuming a same load, fewer computing instances may be used to adequately compute the load. Thus, vertical scaling does not necessarily entail horizontal scaling, or if vertical and horizontal scaling are performed together, the vertical and horizontal scaling may be performed in different directions. In other words, when a group of computing instances is vertically scaled up to a larger computing instance type, the group of computing instances may also be horizontally scaled down to fewer computing instances.

The vertical scaling rules defined by the administrator 280 may define how to vertically and horizontally scale the group of computing instances. The number of computing instances and the type of computing instances may be considered together to optimize how to vertically and horizontally scale. For example, a rule may define that when X number of the current computing instance type in a fleet or group of computing instances is reached, then replace the computing instances with an upgraded type Y computing instance at a defined ratio. As a more specific example, a rule may define that the group of computing instances be instantiated as "small" computing instances that are horizontally scalable. However, when the group of computing instances is scaled up to five small computing instances, then replace the five small computing instances with three "medium" computing instances. In this example, the ratio is a 5:3 ratio. Any other suitable ratio may be selected or defined by the administrator 280 for upgrading and/or downgrading the computing instances.

When replacing a group of computing instances with a different type of computing instances, the entire group may be replaced. To maintain continuity of processes or services executing on the computing instances, the computing instances in the group may be gradually replaced over time with the new computing instance type. The amount of time for the replacement and the number of computing instances being replaced at any given time during the conversion may vary based on specific circumstances. In a smaller group of computing instances, the number of computing instances being replaced at a given time may generally be smaller than when the group of computing instances is larger and there are more computing instances to replace at a time. A small group of computing instances may allow for efficient replacement in a timely manner without significant detriment to performance of processes on the computing instances. The management console 270 may identify the current load and what computing instances to maintain to perform the load while gradually replacing the computing instances. The replacement may not be a 1:1 replacement of computing instances. In the example above with the 5:3 ratio of small to medium computing instances, two small computing instances may be replaced with a single medium computing instance before replacing the next two small computing instances with another medium computing instance and so the replacement may take place in stages. The ratio may be a number of the first computing instances to a number of the second computing instances. However, the ratio may be a ratio of one or more variables in addition to or other than the number of the first or second instances. For example, the ratio may include one or dimensions related to compute units, memory, storage or the like. The ratio may be a complex ratio including two or more types of variables. In another example, the vertical scaling rules may be based, at least in part, on the relationship between the one or more variables which may be associated with the first instance type and the second instance type.

When replacing computing instances, the replacement may be a gradual or rolling replacement or a single deployment of computing instances, as mentioned. Otherwise, a service may experience interruptions where no computing instances are running. For example, a vertical scaling rule may define that 10 percent of the group of computing instances is to be replaced every 10 minutes. According to the rule, the computing instances to be replaced may be terminated and the replacement computing instances may be launched. A vertical scaling rule defining the replacement may be based on an alarm 262 or collection of alarms. The vertical scaling rule may specify a ratio of the current to replacement computing instance types. The vertical scaling rule may define a new vertical scaling rule to apply to the replacement computing instances to manage them differently than the current computing instances. The vertical scaling rule may define a rate at which to replace computing instances, but with a minimum number of computing instances to remain running in the group at any given time. The vertical scaling rule may define that replacements are to be performed by replacing all current computing instances with a larger computing instance, for example, at the defined rate. Alternatively, the vertical scaling rule may define that the current computing instances are to be replaced when a defined lifetime for the computing instance is reached. For example, if each computing instance is refreshed or recycled by terminating the computing instance and starting up a new computing instance every two days, the rule may define that when a decision is made to replace the current computing instances with the replacement computing instance type, then the replacement may be performed at the scheduled refresh rate. Every computing instance in the group may be replaced with the new type within the defined refresh period.

In one example, the vertical scaling rules may define the type of computing instance to use as a replacement for a defined current computing instance type. In other words, the vertical scaling rules may state that when upgrading, a medium type of computing instance is to be replaced with a large type of computing instance, and when downgrading, a medium type of computing instance is to be replaced with a small type of computing instance. However, rather than define or specify the computing instance type by name, the computing instance type may be indicated by any other suitable classification, such as a memory size or factor, compute units, storage, architecture, I/O performance, cost and so forth. In other words, and by way of example, a rule may specify that when upgrading, the upgrade is to be made to a computing instance type having (at least) X gigabytes of memory, or the rule may state that the upgrade may have a factor of X greater for the memory than the original computing instance. In some cases, such a specification may define a single computing instance type. However, in other cases such a specification may cover multiple computing instance types. In this case, the selection of the computing instance type may be made according to a predefined rule or an administrator defined vertical scaling rule. For example, the rule may state that when a classification of computing instance type encompasses multiple computing instance types, then a secondary, tertiary, quaternary or further classification may also be considered to narrow the specified computing instance types to a single computing instance type. Thus, in addition to specifying X gigabytes of memory, a maximum cost may be specified, along with a computing architecture and so forth. Some of these classifications are illustrated in a table of example computing instances provided later herein.

In one example, the replacement may be performed by terminating one or more computing instances of a first type and then starting up one or more computing instances of a second type to replace the first type of computing instances. In another example, the replacement may be performed by starting up one or more computing instances of the second type to replace the first type of computing instances before terminating the one or more computing instances of the first type. In yet another example, a process of terminating one or more computing instances of the first type may be performed at least partially concurrently with the starting up of the one or more computing instances of the second type.

Many load balancers for managing a group of computing instances are not configured to handle groups of computing instances with mixed types. As a result, efficiency of performing processes on mixed type groups may decrease, leading to an increase in latency. However, a mixed group of computing instance types may be maintained in some examples where the entire group of computing instances is not replaced with a different type, but rather where a subset of the group is replaced with a different type and another subset remains the same. This scenario may be currently more viable in particularly large groups of computing instances. In some examples, a large group of computing instances may be managed by multiple load balancers and the mixed group may be managed by assigning a different type of computing instance to each of the load balancers, so each load balancer may manage one computing instance type. In another example, a load balancer configured to manage a mixed group of computing instance types may be used. Operating a mixed group of computing instance types during a gradual replacement process may generally provide acceptable performance and may be a temporary situation.

When upgrading or downgrading computing instance types, the computing instance may be moved to a different physical host or virtual machine. Alternatively, additional resources may be provisioned to the same physical host or virtual machine to effectively upgrade the machine. The management console 270 may display the upgraded or downgraded machine as a different or new machine regardless of whether the underlying physical host or virtual machine is the same or not (but with additional or reduced resources).

With continued reference to FIG. 2, FIG. 2 illustrates a monitoring service 215 in a service provider environment that is configured to monitor service provider resources 232, such as computing instances, optionally using an agent 233, by monitoring API (Application Programming Interface) calls, or by any other suitable method. The monitoring service 215 may enable monitoring of service provider resources 232 as events occur, including, for example, monitoring: computing instances, storage volumes, elastic load balancers, relational database service database instances and so forth. Metrics 260 such as CPU utilization, latency, and request counts may be provided automatically for the resources. Administrators 280 may further supply custom application and system metrics, such as memory usage, transaction volumes, or error rates, which may be monitored in the monitoring service 215. With the monitoring service 215, administrators 280 may access up-to-the-minute statistics 264, view graphs, and set alarms 262 for metric data. The monitoring service 215 functionality may be accessible to the administrator 280 via API, command-line tools, an SDK (Software Development Kit), and/or a management console 270.

The management console 270 may be used by the administrator 280 to view statistics for the collected metrics. The monitoring service 215 may provide an alarm service 262 to send notifications 266 or to activate triggers to automatically make changes (such as vertical and/or horizontal scaling 268 of service provider resources) to the resources being monitored based on rules that are defined by the administrator 280. For example, the administrator 280 may wish to monitor CPU usage and disk reads and writes, and then use this data to determine whether to launch additional computing instances or replace current computing instances with a different instance type to manage increased load. The alarm service 262 may provide triggers to stop, start, or terminate applications, processes, computing instances, and so forth when certain criteria meeting predefined rules are met. In addition, the alarms may initiate auto scaling and/or notification actions.

The monitoring service 215 may include a metrics repository or data store from which administrators 280 or other statistics consumers 275 may retrieve statistics 264 based on those metrics 260. The metrics 260 may be used to calculate statistics 264 and present the data graphically in the management console 270. The management console 270 may enable an administrator 280 to view graphs and statistics for any of the collected metrics and view a quick overview of alarms and monitored resources in one location. Once metrics 260 are uploaded to the monitoring service 215, the metrics 260 may be visualized in the management console 270, or the administrator 280 may define and set alarms 262.

The management console 270 may provide machine analysis 290 of statistics 264 and/or metrics received from the monitoring service 215. For example, business rules, scripts, machine learning and the like may be used to analyze the statistics 264 for the presence of known or predefined issues, resource usage beyond a predetermined threshold and so forth to identify issues, problems, etc. These may be flagged in the management console 270 for the administrator 280 to review.

It should be appreciated that although certain implementations disclosed herein are described in the context of computing instances or virtual machines, other types of computing configurations can be utilized with the concepts and technologies disclosed herein. For instance, the technologies disclosed herein can be utilized directly with physical hardware storage resources or virtual storage resources, hardware data communications (i.e., networking) resources, I/O hardware and with other types of computing resources.

The term "data store" used herein may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

Services provided through service provider resources 232 in the service provider environment, may represent one or more processes executing on a server or other computer hardware. Such services may be centrally hosted functionality or a service application that may receive requests and provide output to other services or devices. For example, services may be considered on-demand computing that is hosted in a server, virtualized environment, grid or cluster computing system.

When a computing instance is launched, the instance type that is specified determines the real hardware or virtualized hardware of the host computer used for the computing instance. Each computing instance type may typically offer different compute, memory, and storage capabilities. The computing instance type may be selected based on the requirements of the application or software that is to run on the computing instance. Each computing instance may be provided with a consistent and predictable amount of CPU (Central Processing Unit) capacity, regardless of the underlying hardware. Some resources of the host computer, such as CPU, memory, and instance storage, may be dedicated to a particular computing instance. Other resources of the host computer, such as the network and the local disk subsystem, may be shared among computing instances. If each computing instance on a host computer tries to use as much of one of these shared resources as possible, each receives an equal share of that resource. However, when a resource is under-utilized, a computing instance may be allowed to consume a higher share of that resource while the under-utilized resource is available.

Each computing instance type may provide higher or lower minimum performance from a shared resource. For example, instance types with high I/O performance may have a larger allocation of shared resources. Allocating a larger share of shared resources may also reduce the variance of I/O performance. For many applications, moderate I/O performance is sufficient.

A wide selection of computing instance types may be provided which are optimized to fit different use cases. Computing instance types may comprise varying combinations of CPU, memory, storage, and networking capacity and provide the flexibility to choose the appropriate mix of resources for a particular application. Each computing instance type may be further categorized to include one or more instance sizes, allowing for scaling to meet a workload.

Fixed performance computing instances and burstable performance computing instances may be offered as different computing instance types. Burstable performance computing instances may provide a baseline level of CPU performance with the ability to burst above the baseline. Many applications such as web servers, developer environments and small databases do not need consistently high levels of CPU, but benefit significantly from having full access to very fast CPUs in certain circumstances, such as for video encoding, high volume websites or the like.

Multiple storage options may be provided for different computing instance types. For example, a variety of storage options may be provided for analysis, hosting, backup, archiving or other situations. Enhanced networking capabilities may be provided for certain computing instance types to provide significantly higher packet per second (PPS) performance, lower network jitter and lower latencies. This feature uses a network virtualization stack that provides higher I/O performance and lower CPU utilization compared to traditional implementations. Cluster networking, where computing instances are launched into a common cluster placement group and placed into a logical cluster that provides high-bandwidth, low-latency networking between all computing instances in the cluster, may be another networking option available for certain computing instance types.

The following Table 1 illustrates some example computing instance types categorized by "family", where an instance family represents a performance characteristic specific to each of the computing instance types in that family.

TABLE 1

| Instance Family | Computing instance Types |
| --- | --- |
| General purpose | t2.micro | t2.small | t2.medium | m3.medium | m3.large | m3.xlarge | m3.2xlarge |
| Compute optimized | c3.large | c3.xlarge | c3.2xlarge | c3.4xlarge | c3.8xlarge |
| Memory optimized | r3.large | r3.xlarge | r3.2xlarge | r3.4xlarge | r3.8xlarge |
| Storage optimized | i2.xlarge | i2.2xlarge | i2.4xlarge | i2.8xlarge | hs1.8xlarge |
| GPU instances | g2.2xlarge |

Vertical scaling of computing instances between different types of computing instances may be within the same instance family, although vertical scaling to other instance families may also be performed in some examples. Table 2 below illustrates some additional specific details or classifications, as mentioned previously, that may pertain to some available computing instance types for a general purpose instance family. As mentioned previously, the name or any other suitable classification, such as memory, compute units, storage, etc. may be used to identify a computing instance type or narrow the selection of computing instance types for vertically scaling up or down (in other words, upgrading or downgrading existing computing instances).

TABLE 2

| Name | Memory | Compute Units | Storage | Architecture | I/O Performance |
| --- | --- | --- | --- | --- | --- |
| T2 Micro | 1.0 GB | Burstable | 0 GB | 64-bit | Low to Moderate |
| T1 Micro | 0.613 GB | Burstable | 0 GB | 32/64-bit | Very Low |
| T2 Small | 2.0 GB | Burstable | 0 GB | 64-bit | Low to Moderate |
| M1 General Purpose Small | 1.7 GB | 1 ( core × 1 unit) | 160 GB | 32/64-bit | Low |
| T2 Medium | 4.0 GB | Burstable | 0 GB | 64-bit | Low to Moderate |
| M3 General Purpose Medium | 3.75 GB | 3 (1 core × 3 unit) | 4 GB SSD | 64-bit | Moderate |
| M1 General Purpose Medium | 3.75 GB | 2 (1 core × 2 unit) | 410 GB | 32/64-bit | Moderate |
| M3 General Purpose Large | 7.5 GB | 6.5 (2 core × 3.25 unit) | 32 GB SSD | 64-bit | Moderate |
| M1 General Purpose Large | 7.5 GB | 4 (2 core × 2 unit) | 840 GB (2 * 420 GB) | 64-bit | Moderate/500 Mbps |
| M3 General Purpose Extra Large | 15.0 GB | 13 (4 core × 3.25 unit) | 80 GB (2 * 40 GB SSD) | 64-bit | High/1000 Mbps |
| M1 General Purpose Extra Large | 15.0 GB | 8 (4 core × 2 unit) | 1680 GB (4 * 420 GB) | 64-bit | High/1000 Mbps |
| M3 General Purpose Double Extra Large | 30.0 GB | 2.6 (8 core × 3.25 unit) | 160 GB (2 * 80 GB SSD) | 64-bit | High/1000 Mbps |

In response to a prediction of increased load, or a scheduled or actual increased load, the computing instances may be scaled vertically and/or horizontally to meet the demand, by replacing existing computing instances with computing instances of a different type which also have different performance characteristics and further optionally by changing a number of deployed computing instances, by increasing or decreasing the number. The vertical and/or horizontal scaling may be an auto scaling that is performed without human interaction and which may be based on scaling rules. Scaling may be performed to maintain a distributed software application or service across a group of computing instances.

As used herein the terms "scaling, or "auto scaling" refer to automatically scaling computing resources by increasing or decreasing the allocation of one or more computing resources to one or more computing applications or computing services. Automatic scaling may be applied to a variety of types and/or classes of computing resources, and scaling may be based on a variety of factors, such as including, but not limited to: CPU (Central Processing Unit) usage, number of threads/processes, available memory, available disk space, network bandwidth and so forth.

Scaling may be applied to a computing service provider that enables automatic launching or termination of computing instances based on user-defined policies, health status checks, and schedules. In addition, auto scaling may analyze various predictive data, such as scheduled promotions, mass communications, internet popularity and so forth to predict increases in demand even in the absence of user-defined policies, health status, or scheduled scaling. For example, computing instances may be servers operating in a computing service provider's computing infrastructure. For distributed applications and services configured to run on a networked computing infrastructure, scaling may be a valuable part of cost control and resource management. For example, scaling increases or decreases the compute capacity of the application or service by either changing the number of servers (horizontal scaling) or changing the size of the servers (vertical scaling).

In an example business situation, when a distributed application begins to predicts an increase in traffic, more servers may be added or the size of existing servers may be increased to handle the additional workload. Similarly, if the traffic to the distributed application is predicted to slow down, under-utilized servers may be terminated or the size of existing servers may be decreased. In some scenarios, vertical scaling may involve changes to server configurations. With horizontal scaling, the number of servers may be simply increased or decreased according to the predicted demands on the distributed application. The decision of when to scale vertically and when to scale horizontally may depend on factors such as the application use case, cost, application performance and infrastructure. Predictive scaling according to the present technology may include horizontal and/or vertical scaling.

When scaling using auto scaling, the number of servers being used may be increased automatically when the user demand goes up to ensure that performance is maintained, and the number of servers may be decreased when demand goes down to minimize costs. Auto scaling may make efficient use of computing resources by automatically doing the work of scaling in the absence of manual intervention. Auto scaling may be well suited for applications that experience hourly, daily, or weekly variability in usage and need to automatically scale to keep up with usage variability.

Figure 3:
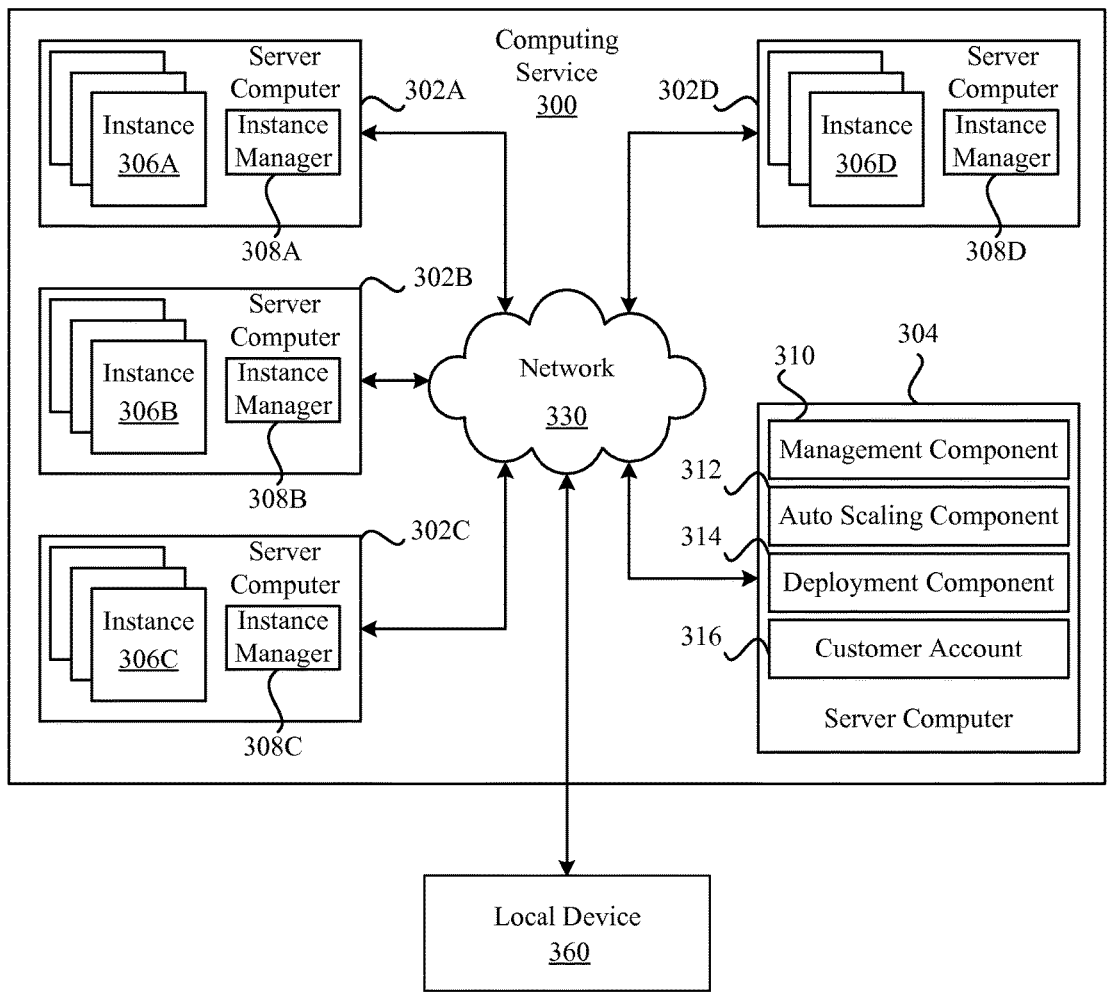
FIG. 3 is a schematic overview of a virtual computing resource provider in accordance with an example of the present technology.

FIG. 3 illustrates how components of a data center may function as a computing service 300 in a service provider environment. As discussed earlier, the computing service 300 (i.e., the cloud provider or service provider) may be capable of delivery of computing and storage capacity as a service to a community of end recipients. In an example implementation, the computing service may be established for an organization by or on behalf of the organization. That is, the computing service 300 may offer a "private cloud environment." In another implementation, the computing service 300 may support a multi-tenant environment, wherein a plurality of customers operate independently (i.e., a public cloud environment). Generally speaking, the computing service 300 can provide the following models: Infrastructure as a Service ("IaaS"), Platform as a Service ("PaaS"), and/or Software as a Service ("SaaS"). Other models may also be provided. In some implementations, end users access the computing service 300 using networked client devices, such as desktop computers, laptops, tablets, smartphones, etc running web browsers or other lightweight client applications. Those skilled in the art will recognize that the computing service 300 can be described as a "cloud" environment.

The particularly illustrated computing service 300 may include a plurality of server computers 302A-302D. While four server computers are shown, any number may be used, and large centers may include thousands of server computers. The server computers 302A-302D may provide computing resources for executing software instances 306A-306D. In one implementation, the instances 306A-306D may be virtual machines. A virtual machine may be an instance of a software implementation of a machine (i.e. a computer) that executes applications like a physical machine. In the example of virtual machine, each of the servers 302A-302D may be configured to execute an instance manager 308 capable of executing the instances. The instance manager 308 may be a hypervisor or another type of program configured to enable the execution of multiple instances 306 on a single server. Additionally, each of the instances 306 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 304 may be reserved for executing software components for managing the operation of the server computers 302 and the instances 306. For example, the server computer 304 may execute a management component 310. A customer may access the management component 310 to configure various aspects of the operation of the instances 306 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 312 may scale the instances 306 vertically or horizontally based upon rules defined by the customer. In one implementation, the auto scaling component 312 allows a customer to specify scale-up policies for use in determining when new instances should be instantiated, including what type of instance to instantiate, and scale-down policies for use in determining when existing instances should be terminated. The auto scaling component 312 may consist of a number of sub-components executing on different server computers 302 or other computing devices. The auto scaling component 312 may monitor available computing resources over an internal management network and modify resources available based on predictions of need as well as based on actual need.

A deployment component 314 may be used to assist customers in the deployment of new instances 306 of computing resources. The deployment component 314 may have access to account information associated with the instances, such as who is the owner of the account, credit card information, country of the owner, etc. The deployment component 314 may receive a configuration from a customer that includes data describing how new instances 306 should be configured. For example, the configuration may specify one or more applications to be installed in new instances 306, provide scripts and/or other types of code to be executed for configuring new instances 306, provide cache logic specifying how an application cache should be prepared, and other types of information. The deployment component 314 may utilize the customer-provided configuration and cache logic to configure, prime, and launch new instances 306. The configuration, cache logic, and other information may be specified by a customer using the management component 310 or by providing this information directly to the deployment component 314.

Customer account information 316 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. Information such as the unique identifier, IP addresses used to access the account and so forth may be used in authenticating a user to the service provider environment.

A network 330 may be utilized to interconnect the server computers 302A-302D and the server computer 304, 350. The network 330 may be a local area network (LAN) and may be connected to a Wide Area Network (WAN) 340 so that end users may access the computing service 300. It should be appreciated that the network topology illustrated in FIG. 3 has been simplified and that many more networks and networking devices may be utilized to interconnect the various computing systems disclosed herein.

Figure 4:
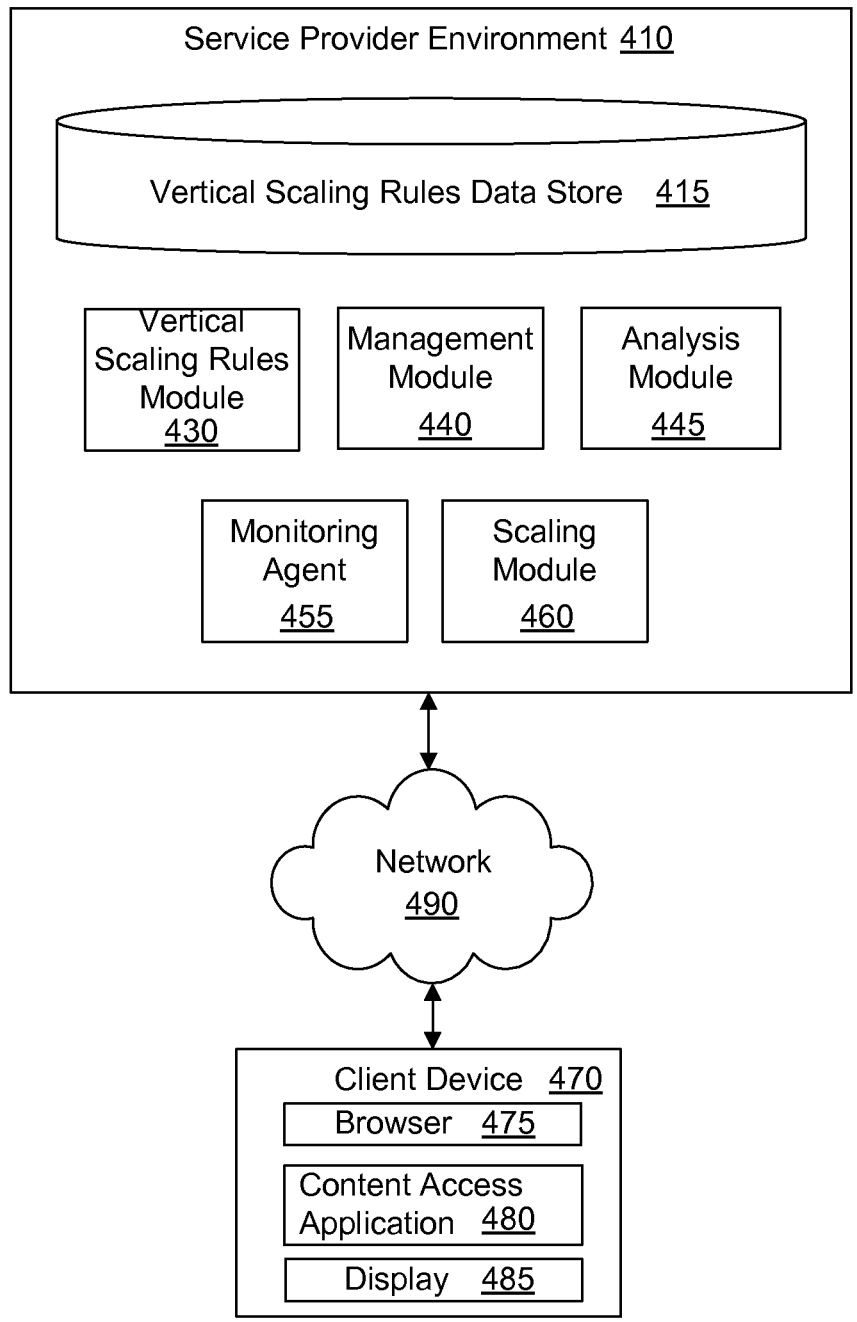
FIG. 4 is a block diagram of a system for scaling computing instances in accordance with an example of the present technology.

Referring now to FIG. 4, a block diagram of a system for vertical scaling of computing instances or computing instance clusters is illustrated in accordance with an example of the present technology. The system may be implemented using one or more computing devices in a service provider environment 410, such as a server as an example computing device, as well as client devices 470, and may be implemented across a network 490. The system may include a data store 415 and a number of modules 430, 440, 445, 460 for storing and processing data to be used in vertical scaling.

Computing services offered by a service provider environment 410, may include a computing device that executes as one or more servers or computing instances. A user may operate one or more servers to execute an operating system and computing applications as a service. A user may create, launch, and terminate servers as desired. The user may have some control over the geographical location of servers or clusters of servers to optimize latency and provide high levels of redundancy.

The user may access and manage the one or more servers over a network connection, such as a connection through the Internet, for example. The user may perform various operations on the servers such as adding, updating, modifying, deleting or other otherwise maintaining software or services on the servers. These operations may be performed by the user from the client device 470.

The server(s) may be a virtual computing instance as previously explained, and the virtual computing instance may be implemented using a virtualization computing environment in a service provider environment 410, which may include a virtual distributed computing system with a virtualization layer executing on a hardware substrate layer. The hardware layer may include a plurality of physical computers, servers or processing nodes. The virtualization layer (e.g., hypervisor) may provide a platform on which virtual computing instances may be created. In other words, the virtual computing instances may execute on the hardware layer by using the platform provided by the virtualization layer. This computing service architecture that supports computing instances is illustrated in more detail in FIG. 3.

Scaling of computing resources or instances may be enabled by vertical scaling rules or policies with respect to one or more usage components. In some examples, the rules may include formulas. Such formulas may be heuristic, multiplicative, algebraic, logarithmic, exponential, or the like. Also, formulas may be applied to one or more components of the monitored computing resources such as, CPU utilization, resident memory (RAM), block device storage (e.g., hard disks), storage device latency, memory paging, number of disk writes, block device I/O demands, or the like, such as when a prediction is made for a different cluster of computing instances than a cluster from which computing resources were monitored. These formulas may include using one or more well-known methods such as, Chi-squared Automatic Interaction Detectors (CHAID), for comparing and/or detecting the interactions the various monitored computing components have on each other.

The system may include a management module 440. The management module 440 may enable management of the virtual computing instances, setting of vertical scaling rules, viewing of reports of performance and so forth by an administrator of the virtual computing instances. The management module 440 may be used to manage what data is to be monitored and/or collected by the monitoring agent 455. In addition to the performance data described previously, the monitoring agent may also monitor other types of data, such as information posted on specified websites, performance or scaling of other services/clusters/instances, and so forth. The management module 440 may be used to define websites, services and the like which are to be monitored. In other words, the management module 440 may be used by an administrator to define vertical scaling rules for when and how to scale, what to monitor and so forth. The vertical scaling rules may be enforced by a rules module 430. The rules module 430 may also be configured to store, modify, add, update, delete or otherwise manage vertical scaling rules stored in a rules data store 415.

The system may include an analysis module 445. The analysis module 445 may analyze data, such as data obtained by the monitoring agent 455 for example, to identify data relevant to identifying or predicting increases or decreases in demand on a workload of a cluster of computing instances. The data identified by the analysis module 445 may be used by the scaling module 460 to vertically or horizontally scale the computing clusters or computing instances (e.g., swap to different types of computing instances).

The system may include one or more data stores 415. The data store 415 may include or be configured to store any of a variety of useful types and formats of data. For example, the data store 415 may be a rules data store for storing the vertical scaling rules for scaling, monitoring and so forth, as has been described.

Client devices 470 may access data, content pages, services and so forth via a computing instance or server in a computing service provider environment 410 or one or more computing instances or clusters, over a network 490.

Example client devices 470 may include, but are not limited to, a desktop computer, a laptop, a tablet, a mobile device, a television, a cell phone, a smart phone, a hand held messaging device, a personal data assistant, an electronic book reader, heads up display (HUD) glasses or any device with a display 485 that may receive and present the message content.

The system may be implemented across one or more computing device(s) connected via a network 490. For example, a computing device may include a data store and various engines and/or modules such as those described above and such modules may be executable by a processor of the computing device. The system may be implemented as a plurality of computing nodes or computing instances, each of which comprises at least one processor and a memory, where the computing nodes are configured to collectively implement the modules, data stores and so forth.

The modules that have been described may be stored on, accessed by, accessed through, or executed by a computing device. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

The client device shown in FIG. 4 may be representative of a plurality of client devices 470 that may be coupled to the network 490. The client device(s) 470 may communicate with the computing device over any appropriate network, including an intranet, the Internet, a cellular network, a local area network (LAN), a wide area network (WAN), a wireless data network or a similar network or combination of networks.

The client device 470 may include a display 485. The display 485 may comprise, for example, one or more devices such as cathode ray tubes (CRTs), liquid crystal display (LCD) screens, gas plasma based flat panel displays, LCD projectors, or other types of display devices, etc.

The client device 470 may be configured to execute various applications such as a browser 475, a respective page or content access application 480 for an electronic retail store and/or other applications. The browser 475 may be executed in a client device 470, for example, to access and render content pages, such as web pages or other network content served up by the computing device and/or other servers. The content access application 480 may be executed to obtain and render for display content features from the server or computing device, or other services and/or local storage media.

In some implementations, the content access application 480 may correspond to code that is executed in the browser 475 or plug-ins to the browser 475. In other implementations, the content access application 480 may correspond to a standalone application, such as a mobile application. The client device may be configured to execute applications beyond those mentioned above, such as, for example, mobile applications, email applications, instant message applications and/or other applications. Users at client devices 470 may access content features through content display devices or through content access applications 480 executed in the client devices 470.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules.

Figure 5:
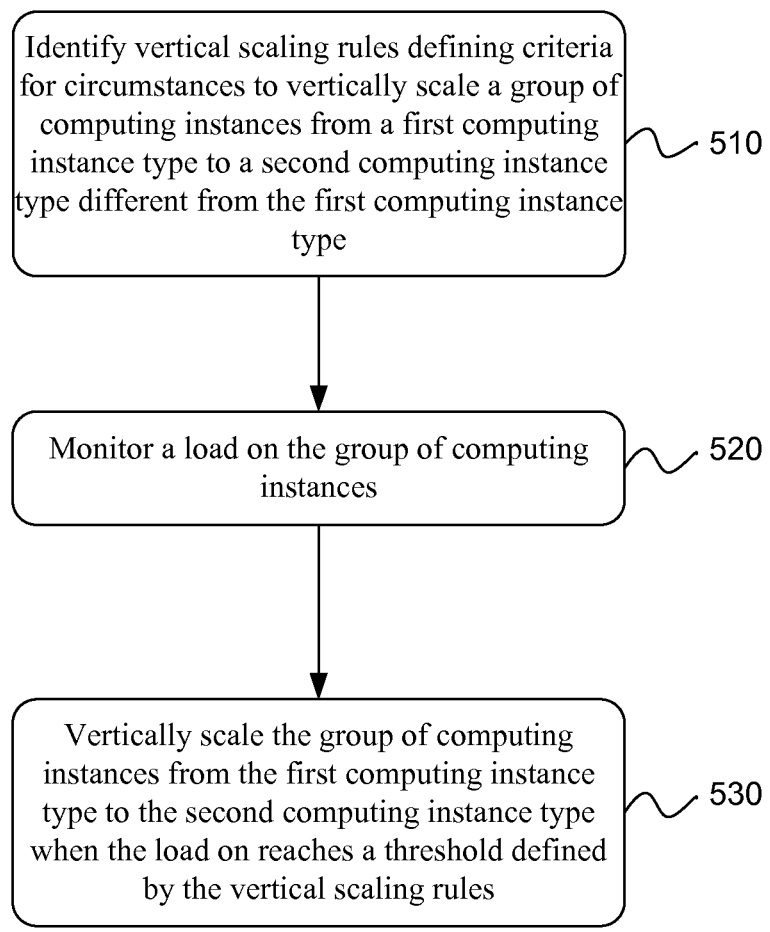
FIGS. 5-6 are flow diagrams for methods of scaling computing instances in accordance with examples of the present technology.
Figure 6:
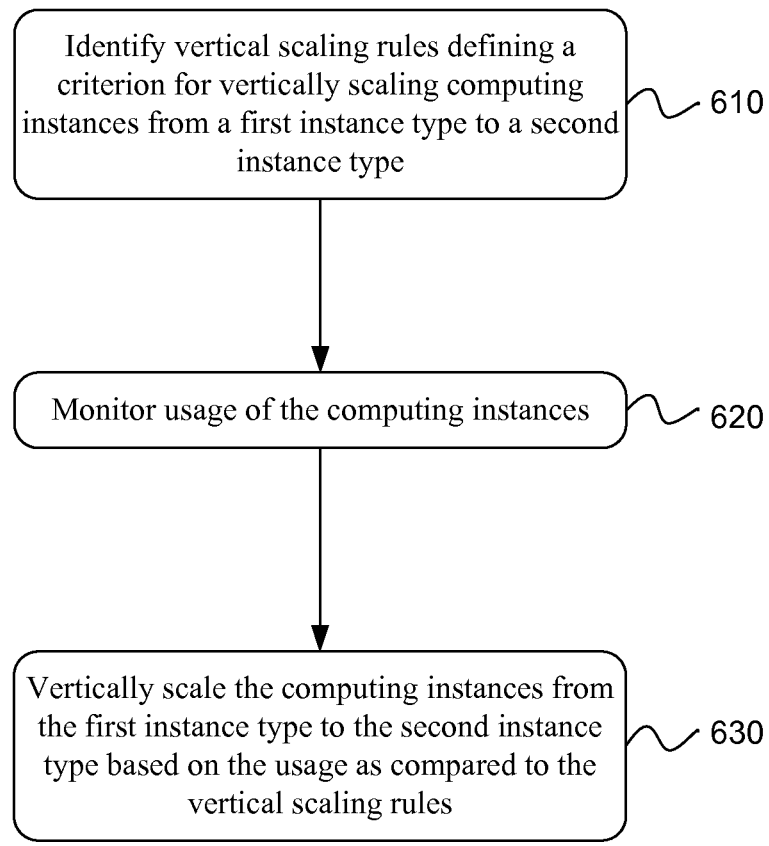

FIGS. 5-6 illustrate flow diagrams of methods according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 5, a flow diagram of a method is illustrated for scaling a cluster of computing instances. The method may include identifying 510 vertical scaling rules defining criteria for circumstances to vertically scale a group of computing instances. The vertical scale rules may be for vertically scaling the group of computing instances from a first computing instance type to a second computing instance type. The first and second computing instance types may be different from one another. The method may further include monitoring 520 a load on the group of computing instances, such as by using a monitoring agent or monitoring service. The group of computing instances may be vertically scaled 530 from the first computing instance type to the second computing instance type when the load on the computing instances reaches a threshold defined by the vertical scaling rules.

The method may further include evaluating a size of the group of computing instances and the first instance type together to identify the second instance type from among a plurality of different instance types. For example, the vertical scaling rules may define that for a certain number of computing instances of a certain type, vertical scaling should be a replacement of the computing instances with a different specified type.

The method may include replacing an entirety of the group of computing instances of the first instance type with a group of computing instances of the second instance type. The replacement may be a rolling replacement. In a rolling replacement, different computing instances in the group may be replaced at different times, resulting in a temporarily mixed type computing instance group. In other examples, less than an entirety of the group of computing instances of the first instance type may be replaced with computing instances of the second instance type.

In some of the examples described previously, a monitoring agent is used to monitor computing instances to determine whether to scale the current cluster of computing instances. However, in some examples, the computing instances may be configured to send a notification or request for the computing instances to scale. In this example, the request may be sent to an administrator.

In some examples, this or other methods described herein may be implemented wholly or partially as computer readable program code executed by a processor and the computer readable code may be embodied on a non-transitory computer usable medium.

Referring now to FIG. 6, a flow diagram of a method is illustrated for scaling a cluster of computing instances. The method may include identifying 610 vertical scaling rules defining a criterion for vertically scaling computing instances from a first instance type to a second instance type. The method may further include monitoring 620 usage of the computing instances and vertically scaling 630 the computing instances from the first instance type to the second instance type based on the usage as compared to the vertical scaling rules.

In some examples, the second instance type may be selected from among a plurality of different instance types based on the usage of the computing instances as compared to the vertical scaling rules. For example, heavier memory usage may result in selection of a computing instance type more optimized for high memory usage. The usage of the computing instances may be considered together with a financial cost of maintaining the computing instances or a load on the computing instances. Different instance types may be available at different price points and the rules may be defined to balance selection of instance types against defined price points for different performance or usage characteristics for the computing instances. In other words, the vertical scaling rules may be configured to implement vertical scaling to minimize cost while maintaining a defined performance level of the computing instances as a group.

The method may include vertically scaling the computing instances upward to the second instance type. The second instance type may have increased performance characteristics as compared with the first instance type. Alternatively, the method may include vertically scaling the computing instances downward to the second instance type. In this example, the second instance type may have decreased performance characteristics as compared with the first instance type.

The vertical scaling rules may provide a scaling alarm to notify an administrator when the usage of the computing instances exceeds a threshold. The vertical scaling rules may optionally include a scaling trigger to initiate vertically scaling the computing instances.

Figure 7:
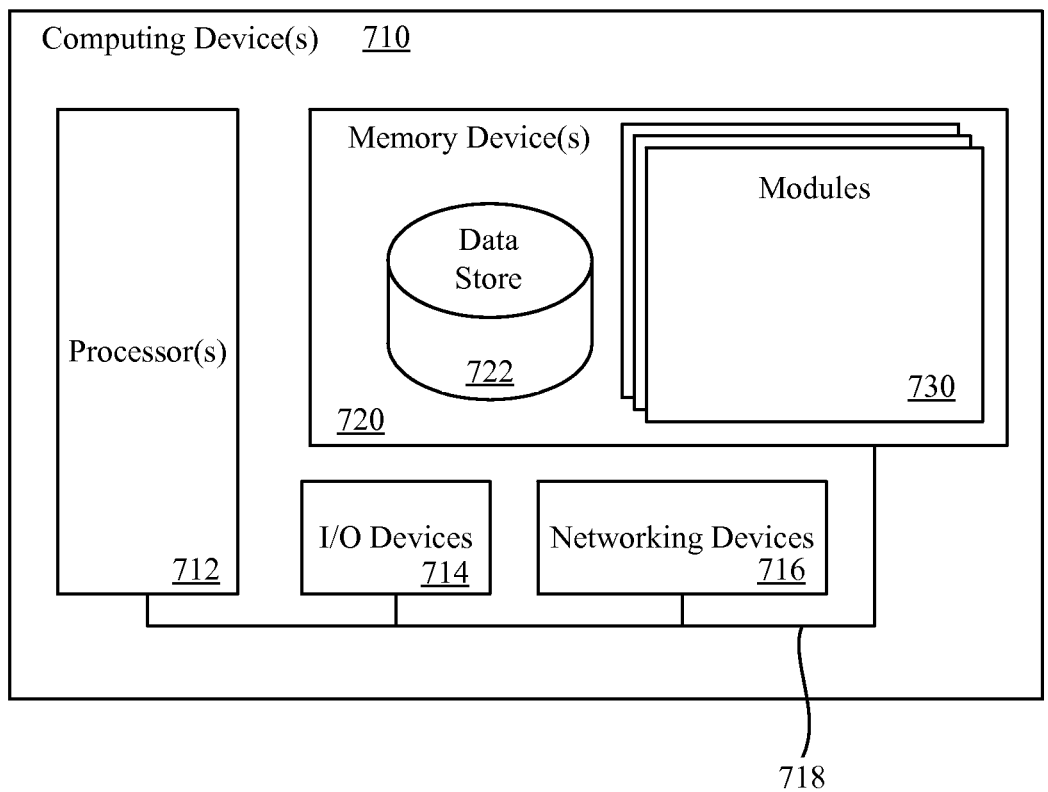
FIG. 7 is a block diagram of a computing system for scaling computing instances in accordance with an example of the present technology.

FIG. 7 illustrates a computing device 710 on which services or modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 730 that are executable by the processor(s) and data for the modules. A data store 722 may also be located in the memory device 720 for storing data related to the modules and other applications along with an operating system that is executable by the processor(s) 712.

The computing device 710 may further include or be in communication with a client device, which may include a display device. The client device may be available for an administrator to use in interfacing with the computing device 710, such as to review operation of a virtual computing instance, make improvements to machine learning models and so forth.

Various applications may be stored in the memory device 720 and may be executable by the processor(s) 712. Components or modules discussed in this description that may be implemented in the form of software using high programming level languages that are compiled, interpreted or executed using a hybrid of the methods.

The computing device 710 may also have access to I/O (input/output) devices 714 that are usable by the computing devices. An example of an I/O device 714 is a display screen that is available to display output from the computing devices. Other known I/O device may be used with the computing device as desired. Networking devices 716 and similar communication devices may be included in the computing device 710. The networking devices 716 may be wired or wireless networking devices 716 that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A computing device that is configured to scale a group of computing instances, comprising:
   a processor;
   a memory in electronic communication with the processor;
   instructions stored in the memory, the instructions being executable by the processor to:
      identify vertical scaling rules defining criteria for circumstances to vertically scale at least two computing instances managed by a service provider environment from a first computing instance type to a second computing instance type, wherein the first computing instance type and the second computing instance type are pre-defined computing instance types specifying a different pre-defined configuration of computing resources offered by the service provider environment as a computing instance;
      monitor a load on the at least two computing instances running on one or more physical hosts of the service provider environment;
      vertically scale the at least two computing instances from the first computing instance type to the second computing instance type when the load on the at least two computing instances reaches a load indicated by at least one of the vertical scaling rules associated with the at least two computing instances and defining how a first pre-defined computing instance type is changed to a second pre-defined computing instance type; and
      horizontally scale the at least two computing instances to change a number of computing instances based, at least in part, on the second computing instance type.

2. The computing device of claim 1, further configured to evaluate the number of computing instances and the first instance type together to identify the second instance type from among a plurality of different instance types for vertically scaling the at least two computing instances up or down to respectively larger or smaller computing instance types based on the load.

3. The computing device of claim 1, further configured to replace an entirety of a group of computing instances of the first instance type with a group of computing instances of the second instance type.

4. The computing device of claim 3, further configured to perform a rolling replacement of a plurality of computing instances of the first instance type, wherein different computing instances are replaced at different times.

5. The computing device of claim 1, wherein vertically scaling the at least two computing instances comprises replacing less than an entirety of the number of computing instances of the first instance type with computing instances of the second instance type.

6. A computer-implemented method, comprising:
identifying vertical scaling rules defining a criterion for vertically scaling a plurality of computing instances managed by a service provider environment from a first instance type to a second instance type, wherein the first instance type and the second instance type are pre-defined computing instance types specifying a different pre-defined configuration of computing resources offered by the service provider environment as a computing instance;
monitoring usage of the plurality of computing instances running on one or more physical hosts of the service provider environment, using a processor; and
vertically scaling the plurality of computing instances from the first instance type to the second instance type based, based at least in part, on usage data as compared to at least one of the vertical scaling rules associated with the plurality of computing instances defining how a first pre-defined computing instance type is changed to a second pre-defined computing instance type.

7. The method of claim 6, further comprising selecting the second instance type from among a plurality of different instance types based on whether vertical scaling includes downgrading the plurality of computing instances or upgrading the plurality of computing instances.

8. The method of claim 6, further comprising evaluating a cost of maintaining the plurality of computing instances in combination with the usage of the plurality of computing instances in view of the vertical scaling rules to identify the second instance type.

9. The method of claim 6, further comprising vertically scaling the plurality of computing instances upward to the second instance type, the second instance type having increased computing performance characteristics as compared with the first instance type.

10. The method of claim 6, further comprising vertically scaling the plurality of computing instances downward to the second instance type, the second instance type having decreased computing performance characteristics as compared with the first instance type.

11. The method of claim 6, wherein the vertical scaling rules are configured to implement vertical scaling to minimize cost while maintaining a defined performance level of multiple of the plurality of computing instances as a group.

12. The method of claim 6, wherein the vertical scaling rules comprise a scaling alarm to notify an administrator when the usage of the plurality of computing instances exceeds a threshold and a scaling trigger to initiate vertically scaling the plurality of computing instances.

13. The method of claim 6, further comprising horizontally scaling the plurality of computing instances to a smaller number of computing instances when vertically scaling the plurality of computing instances to a larger type of computing instance or horizontally scaling the plurality of computing instances to a larger number of computing instances when vertically scaling the plurality of computing instances to a smaller type of computing instance.

14. The method of claim 6, wherein the instance type is identified by at least one type indicator selected from the group consisting of: instance type name, memory, compute units, storage, architecture, I/O performance and cost.

15. The method of claim 6, wherein the vertical scaling rules are based, at least in part, on a relationship between one or more variables associated with the first instance type and the second instance type.

16. The method of claim 15, wherein the relationship is a ratio of a number of computing instances of the first instance type compared to a number of computing instances of the second instance type.

17. The method of claim 6, further comprising maintaining operation of a defined minimum number of the plurality of computing instances during vertical scaling.

18. The method of claim 6, wherein the vertical scaling further comprises horizontal scaling to increase or decrease a number of the plurality of computing instances.

19. A non-transitory computer-readable medium comprising computer-executable instructions which, when executed by a processor, implement a system, comprising:
a rules data store configured to store vertical scaling rules defining a second instance type to which to vertically scale computing instances managed by a service provider environment from a first instance type, wherein the first instance type and the second instance type are pre-defined computing instance types associated with the service provider environment specifying a different pre-defined configuration of computing resources offered by the service provider environment as a computing instance;
a monitoring agent configured to monitor a load on the computing instances running on one or more physical hosts of the service provider environment; and
a vertical scaling module configured to vertically scale the computing instances from the first instance type to the second instance type when the load on the computing instances reaches a threshold load indicated by at least one of the vertical scaling rules associated with the plurality of computing instances defining how a first pre-defined computing instance type is changed to a second pre-defined computing instance type.

20. The computer-readable medium of claim 19, further comprising a horizontal scaling module to increase or decrease a number of the computing instances.

21. The computer-readable medium of claim 19, further comprising a notification module to notify an administrator when the vertical scaling module vertically scales the computing instances.

* * * * *